United States Patent [19]

Notaro et al.

[11] Patent Number: 5,774,350
[45] Date of Patent: Jun. 30, 1998

[54] INTEGRATED LOW DISSIPATION POWER CONTROLLER

[75] Inventors: Joseph Notaro, Hascalucia, Conn.;
 Antoine Pavlin, Puyricard, France;
 Jean-Michel Ravon, Fuveau, France;
 Luc Wuidart, Pourrieres, France

[73] Assignee: SGS-Thomson Microelectronics S.A., Saint Genis, France

[21] Appl. No.: 628,831

[22] Filed: Apr. 5, 1996

Related U.S. Application Data

[60] Provisional application No. 60/007,757 Nov. 30, 1995.

[30] Foreign Application Priority Data

Apr. 7, 1995 [FR] France .................................. 95-04193

[51] Int. Cl.[6] .................................................. H02M 7/217
[52] U.S. Cl. ............................................. 363/89; 363/127
[58] Field of Search ............................... 363/81, 89, 127, 363/67, 84, 88

[56] References Cited

U.S. PATENT DOCUMENTS

| | | | |
|---|---|---|---|
| 4,412,277 | 10/1983 | Mitchell | 363/81 |
| 4,922,404 | 5/1990 | Ludwig et al. | 363/89 |
| 5,237,606 | 8/1993 | Ziermann | 379/413 |
| 5,398,182 | 3/1995 | Crosby | 363/89 |
| 5,453,923 | 9/1995 | Scalais et al. | 363/56 |
| 5,590,032 | 12/1996 | Bowman et al. | 363/15 |

OTHER PUBLICATIONS

Acker et al., "Current–Controlled Synchronous Rectification," APEC'94 Ninth Annual Applied Power Electronics Conference and Exposition, IEEE Conference Proceedings, vol. 1, 13–17 Feb. 1994, Orlando, Fla., 185–191.

Archer, "Current drives synchronous rectifier," EDN 28 Nov. 1985, Washington, MA, USA, p. 279.

Patent Abstracts of Japan, vol. 950, No. 001, and JP–A–07 007928 (Fuji Electric Col. Ltd), 10 Jan. 1995.

Patent Abstracts of Japan, vol. 016 No. 392 (E–1251), 20 Aug. 1992 and JP–A–04 127869 (Nippon Telegraph & Telephone Corp.), 28 Apr. 1992.

*Primary Examiner*—Adolf Berhane
*Attorney, Agent, or Firm*—Wolf, Greenfield & Sacks, P.C.; James H. Morris

[57] ABSTRACT

A circuit for controlling two power transistors (24, 26) used an synchronous rectifiers in the secondary side of a switched mode power supply is provided. Current detector circuits (40, 42) measure current through parasitic diodes (28, 30) of the power transistors. It is shown that the synchronisation achieved is more accurate, and the resultant device is simpler and cheaper than previous solutions.

9 Claims, 7 Drawing Sheets

5,774,350

INTEGRATED LOW DISSIPATION POWER CONTROLLER

This is a continuation of provisional application Ser. No. 60/007,757 filed Nov. 30, 1995.

FIELD OF THE INVENTION

The invention relates to the field of DC power supplies, more particularly to switched mode power supplies for providing low voltage DC output, in forward configuration.

BACKGROUND OF THE INVENTION

FIG. 1 shows a schematic diagram of a known switched mode power supply circuit using the commonly known 'forward configuration', having two complementary rectifying diodes or other rectifying elements. An oscillator OSC provides an oscillating input voltage Vin, which may be sinusoidal, square wave or otherwise cyclic. The input voltage Vin is applied to a primary winding Lp of a transformer 10. The input voltage Vin is referenced to a ground voltage GND. The oscillator has a control input C which may control one or more of the frequency, amplitude and duty cycle of its output voltage, Vin. A secondary winding Ls is wound onto a common core with the primary winding of transformer 10. A first terminal of this secondary winding is connected to an anode of a first diode 12. A cathode of this diode 12 is connected to a node 14. A second terminal of the secondary winding Ls is connected to a node 15. A second diode 16 has a cathode connected to node 14 and an anode connected to node 15 and further connected to a negative output terminal V−. The node 14 is further connected to a first terminal of a series inductor 18. A second terminal of the series inductor is connected to a positive output terminal, V+. A capacitor 20 is connected between the output terminals. An external load RL to be powered by the power supply is connected between the output terminals. A feedback element F is usually provided in order to control the duty cycle of the oscillator for achieving a required output voltage or current.

The voltage supplied by the secondary winding is rectified and filtered into a DC output voltage, available between the output terminals V+, V−.

The oscillator OSC produces a voltage signal at a relatively high frequency. The frequency or duty cycle is controlled in response to the value of the output voltage from the power supply, using feedback element F. This high frequency signal induces an alternating voltage in the secondary winding Ls of the transformer. This alternating voltage is half-wave rectified by the first diode 12 and applied to the series inductor 18.

During a positive half cycle of the oscillating input voltage Vin, first diode 12 conducts and applies a voltage to the series inductor 18, which stores energy and transmits a rectified voltage to the positive output terminal V+, to supply the external load RL.

During a negative half cycle, first diode 12 is non-conductive, so the current through the series inductor 18 drops. The series inductor then supplies its stored energy by maintaining a DC current through the diode 16 and the external load RL. The capacitor 20 acts to smooth the output voltage. Because the circuit operates at high frequency, the series inductor 18, the transformer 10 and the capacitor 20 may be relatively small. Such a circuit operates well to supply voltages of 12 V or more.

This circuit, however, presents problems when a low output voltage is required. For example, to power current integrated circuits, a supply of 3.3 V is sometimes required, at several amperes to supply a large circuit comprising many integrated circuits. Typical applications are power supplies for personal computers.

On average, the same current passes through the load RL as passes through the diodes 12, 16. A forward biased diode drop of, for example, 0.6 V is present across each diode as it conducts. Schottky diodes are often used, because these have a lower forward biased diode drop of 0.4 V. For a 3,3 V output, this represents a loss of 0.4/(0.4+3.3)=10.8%. This means that a significant power is dissipated within the rectifier. For a power supply providing a 20A output current, this 0.4 V drop causes a loss of 8 W.

It is desired to produce switched mode power supplies in as small a form as possible. This is, however, difficult if a high power loss must be dissipated. Preferably, the switched mode power supply circuit would be produced in an integrated form (with the exception of the transformer). This cannot be achieved with high power losses, as an integrated circuit would not be large enough to dissipate the required power.

FIG. 2 shows another circuit, known as a synchronous rectification circuit, using controlled N-channel MOSFET transistors in place of the diodes 12, 16 of FIG. 1. The circuit is similar to that of FIG. 1, and identical features have identical reference labels. An N-channel MOSFET transistor 24 replaces diode 12. Another N-channel MOSFET transistor 26 replaces diode 16. MOSFET transistor 24 is connected to the second terminal of the secondary winding Ls, rather than to the first terminal, as was diode 12, so that both transistors 24, 26 respectively may be driven with a common reference to node 15, the negative output voltage V−. Diodes 28, 30 represented in parallel with the transistors 24, 26 indicate the internal parasitic drain-substrate diode action of an N-channel MOSFET transistor when biased with its drain negative with respect to the substrate. The gate electrodes of the MOSFET transistors are connected to a control circuit 32, which applies a positive gate voltage to each transistor when it is required to conduct. An auxiliary winding Laux is wound onto the core of the transformer 10, and has a first terminal connected to the control circuit 32, and a second terminal connected to the second terminal of the secondary winding Ls. The second terminal of the secondary winding is further connected to the control circuit 32.

When each MOSFET is required to conduct, a signal Vg1, Vg2 is applied to its gate to turn it strongly on. A MOSFET transistor, when turned on, has a resistive characteristic. When conducting a current of 20A, the voltage drop across a MOS transistor in such a state is I.Ron (where Ron is the on state resistance of the channel of the MOSFET and I is the current flowing through the channel), which may, for example, be about 0.1 V, thus representing a loss of only 3% for a 3.3 V output supply, or a power dissipation requirement of 2 W. It is not difficult to design integrated circuits and packages for integrated circuits which can dissipate 2 W. In a known manner, the control circuit 32 receives an oscillating voltage from the auxiliary winding Laux, from which it derives the timing information required for the generation of gate signals Vg1, Vg2 to transistors 24, 26.

This solution, however, suffers from propagation delays introduced by parasitic capacitance between the auxiliary and primary windings, which delay the provision of timing information to the control circuit. These delays are especially troublesome when the power supply is operated with a high switching frequency. In addition, as the control circuit is referenced to the voltage V− of node 15, and the primary winding is referenced to ground voltage GND, any sudden change in the difference between the two reference voltages may induce currents to flow through the parasitic capacitance between the primary Lp and auxiliary Laux windings, which may cause the control circuit to lose synchronisation. Such a change may occur, for example, due to a sudden variation in load current in the secondary winding Ls.

Furthermore, a special transformer is required, with three windings, which is much more expensive than a standard transformer with only two windings.

A possible result of the delays or loss of synchronisation is that the two MOSFET transistors 24, 26 may be simultaneously conductive, causing a short circuit across the secondary winding. This could destroy the transformer or the oscillator, and would at best result in significant extra power losses.

SUMMARY OF THE INVENTION

An object of the current invention is to allow the use of MOSFETs as synchronous rectifiers in an isolated switched mode power supply without the above-mentioned drawbacks.

The invention allows the current flowing in the parasitic drain-substrate diode of each MOSFET transistor to be measured by a current detection circuit connected in parallel with the MOSFET transistor, and uses this current detection to turn the MOSFET transistor strongly on as soon as a current is detected in the corresponding parasitic drain-substrate diode. This avoids the necessity of an auxiliary winding Laux, and ensures that the gate signals Vg1, Vg2 are generated in synchronisation with the current flowing through each MOSFET transistor.

Accordingly, the invention provides a switched mode power supply for rectifying an alternating voltage, comprising a control circuit for controlling MOSFET transistors. A number of MOSFET transistors are included, each driven by a control voltage applied to a gate terminal. A current detection circuit is connected to first and second terminals of each MOSFET transistor, in parallel with its channel. Each current detection circuit is activated when a voltage across the corresponding MOSFET transistor's channel attains the value of a forward voltage of a parasitic or distinct diode connected in parallel with that MOSFET transistor. The switched mode power supply of the invention may be operated in the forward configuration synchronous mode.

The current detection circuits may each comprise a transistor whose emitter is connected to an anode of a first diode and whose base is connected to an anode of a second diode. The cathode of the first diode may be connected to the first terminal of the corresponding MOSFET transistor, and the cathode of the second diode may be connected to the second terminal of the corresponding MOSFET transistor.

The supply of the invention may further comprise a transformer with primary and secondary windings, each terminal of the secondary winding being connected to a drain terminal of first and second rectifying means. Source terminals of the rectifying means may be connected together at a reference node. A series inductor having first and second terminals may also be provided, with a first terminal connected to a first terminal of the secondary winding, and with a second terminal connected to a first terminal of a capacitor. The capacitor may have a second terminal connected to the said reference node. An output voltage is provided across the two terminals of the capacitor.

In particular, the rectifying means may be N-channel MOSFET transistors each controlled by a control voltage applied to a respective gate terminal. A circuit may be provided for generating signals to gates of first and second MOSFET transistors, in response to a current through each MOSFET transistor, which applies a signal to the gate of the second MOSFET transistor, rendering its channel nonconductive then a signal to the gate of the first MOSFET transistor, rendering its channel conductive, when a reverse voltage across the channel of the first MOSFET transistor attains the value of a diode forward voltage.

Such a circuit preferably includes circuitry to ensure that no more than one MOSFET transistor receives a signal rendering its channel conductive at any one time. A low load monitoring circuit may be included which disables the generation of control voltages to gate terminals when a predetermined time has elapsed without either of the current detection circuits indicating a current flowing through either of the transistors. Such a low load monitoring circuit may comprise a timing circuit which is normally reset during each half cycle of the alternating voltage by the current detector circuits, and which provides a control voltage inhibition signal if the timing circuit is not reset within the predetermined time. Such a timing circuit may comprise a capacitor, a current source and a controlled impedance element, the resetting of the timer being performed by placing the controlled impedance element in parallel with the capacitor in a low impedance state, and the control voltage inhibition signal being generated in response to a voltage between the terminals of the capacitor. The predetermined time may be slightly longer than the period of oscillation of the alternating voltage.

BRIEF DESCRIPTION OF THE DRAWINGS

A preferred embodiment of the current invention will be described, by way of example, with reference to the accompanying diagrams, wherein.

DETAILED DESCRIPTION

Figure 1:
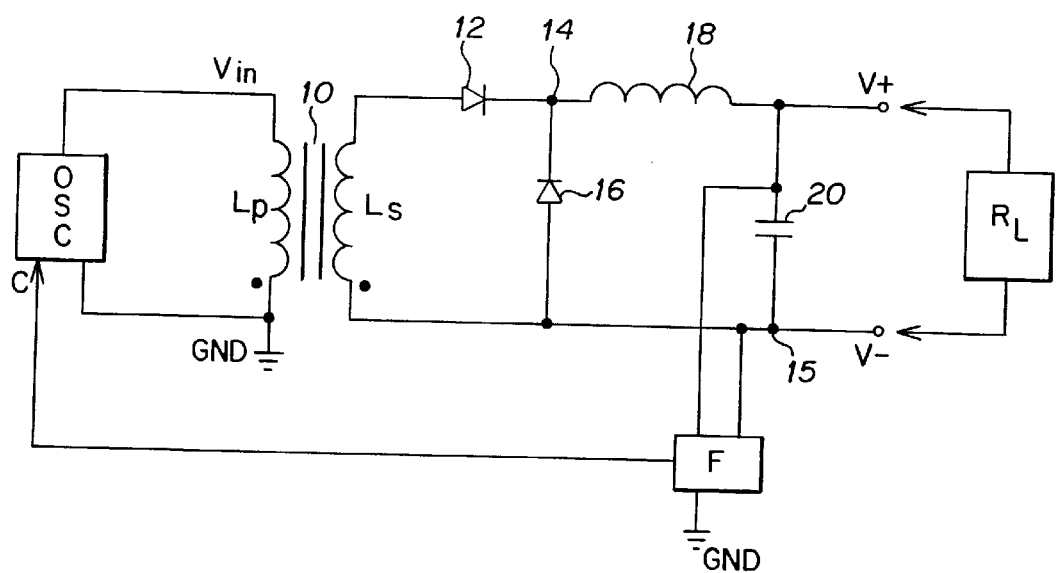
FIG. 1 shows a switched mode power supply of the prior art using diodes as rectifying elements.
Figure 2:
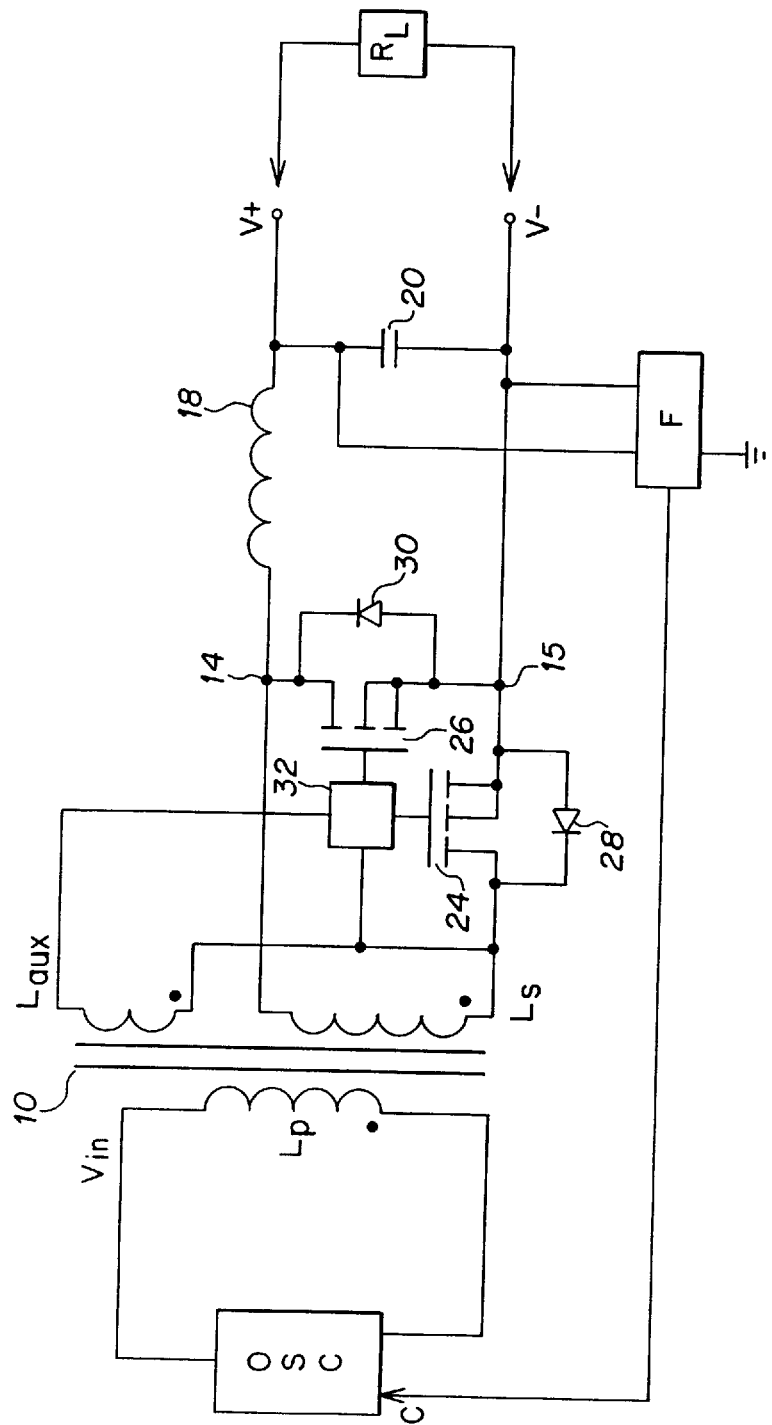
FIG. 2 shows a switched mode power supply of the prior art, using controlled MOSFET transistors as rectifying elements.
Figure 3:
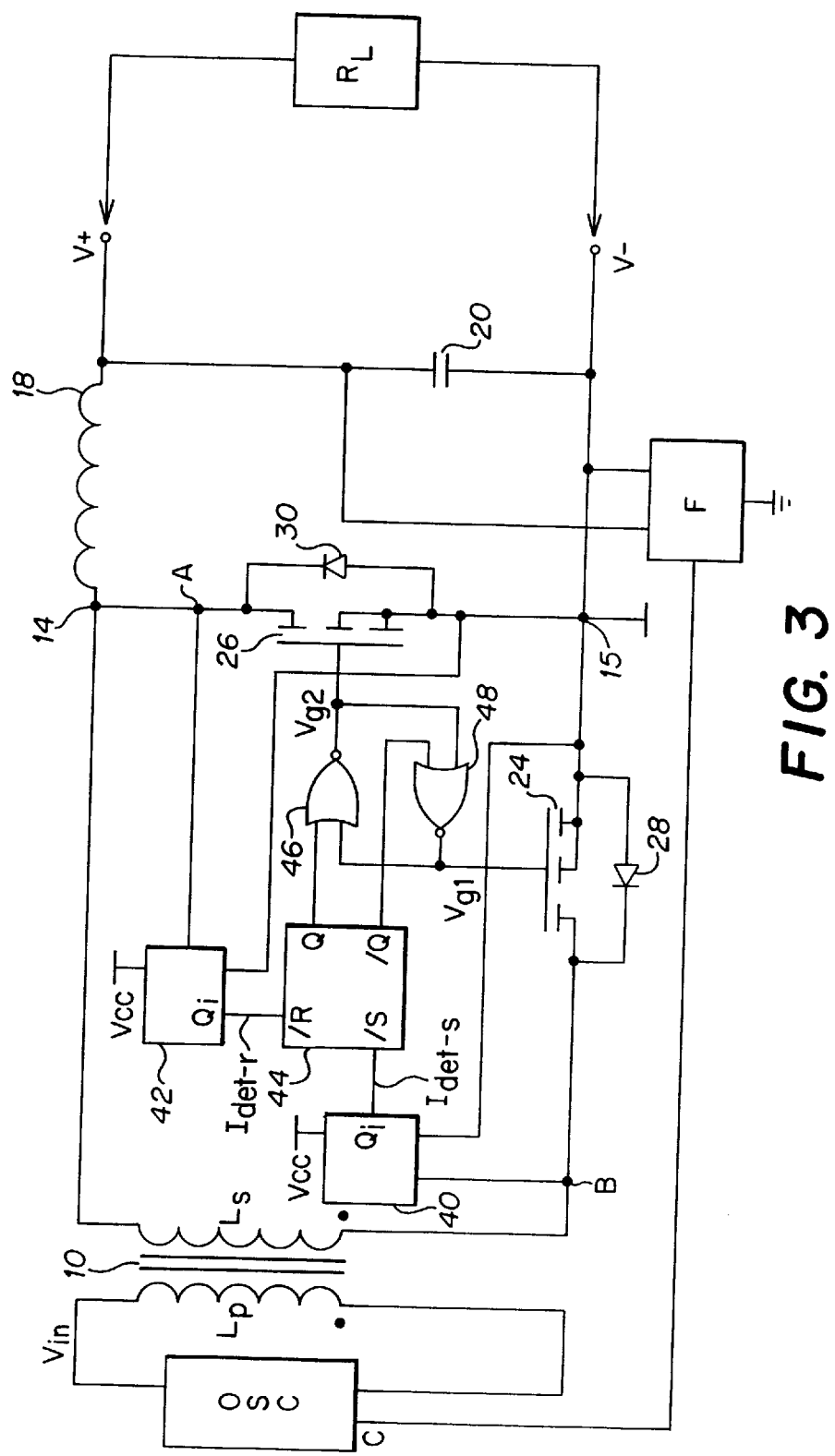
FIG. 3 shows a switched mode power supply incorporating a control circuit according to the current invention.

A switched mode power supply incorporating a control circuit according to the invention is shown in FIG. 3. The power supply circuit includes a transformer 10 having primary Lp and secondary Ls windings. The secondary winding has two terminals, each connected to the drain terminals A, B of first 26 and second 24 MOSFET transistors, respectively. Each MOSFET transistor is controlled by a control voltage Vg1, Vg2 applied to its gate terminal in response to the current flowing through the MOSFET transistor. Current detector circuits 40, 42 for measuring a current through a transistor are connected to A, B and 15, in parallel with the MOSFET transistors 24, 26, respectively.

These current detector circuits 40, 42 are respectively connected to supply output signals Idet-r, Idet-s from their respective output Qi to active-low inputs /R, /S of RS latch 44, when a current is detected. The first current detector 40 provides an active low signal Idet-s to the /S input of the RS latch. The second current detector 42 provides an active low signal Idet-r to the /R input of the RS latch.

The RS latch 44 provides two complementary outputs, Q and /Q. First and second NOR gates 46, 48 receive Q and /Q respectively on first inputs. The NOR gates each have a second input which is connected to the output of the other NOR gate. The outputs Vg2, Vg1 of first and second NOR gates are connected to the gate terminals of the transistors 26, 24, respectively.

At the beginning of a positive half cycle, a high signal vg2 is present on the gate of transistor 26 and a low signal vg1 is present on the gate of transistor 24, both having been applied during the preceding negative half cycle. The drain-substrate parasitic diode 28 of the MOSFET transistor 24 becomes biased into conduction. A current thus flows through the secondary winding Ls, the series inductor 18, the load R1 and drain-substrate parasitic diode 28. The drain-substrate parasitic diode 30 of the transistor 26 is reverse biased, and thus non-conductive.

The current flowing through drain-substrate parasitic diode 28 is detected by current detector 40, which applies a low signal Idet-s to the /S input of the RS latch 44. This causes the output Q of the RS latch to go high, and the /Q output to go low. The output Vg2 of NOR gate 46 goes low, turning off transistor 26. The low levels of /Q and Vg2 are applied to the inputs of NOR gate 48, whose output Vg1 goes high.

The high signal Vg1 applied to the gate of transistor 24 turns that transistor fully on, rendering it very conductive. The voltage drop between source and drain terminals of transistor 24 becomes much lower than a diode forward voltage, and the drain-substrate parasitic diode 28 ceases to conduct. The Vg1 output is delayed by the NOR gate 46 propagation delay with respect to the change of state of the gate voltage Vg2 of transistor 26, so avoiding any possibility of both MOSFET transistors 24, 26 being turned on at the same time.

When the voltage across the secondary winding changes polarity, parasitic diode 30 will begin to conduct. The high signal Vg1 is still present on the gate of transistor 24. The current detector 42 detects the current flowing in the diode 30, and applies an active, low, signal Idet-r to the /R input of the RS latch. The Q output of this latch goes low, and the /Q output goes high. This causes the output Vg1 of NOR gate 48 to go low, turning the transistor 24 off.

The low levels of Q and Vg1 are applied to the inputs of NOR gate 46, whose output Vg2 goes high, and transistor 26 is turned on. The propagation delay introduced by the NOR gate 46 ensures that the transistor 24 is turned off before the transistor 26 is turned on, avoiding any possibility of both transistors being on at the same time, which would cause a short circuit across the secondary winding Ls.

According to an aspect of the invention, current detector circuits 40, 42 are responsive to the voltage across a corresponding MOSFET 24, 26 reaching the forward voltage of the corresponding diode 28, 30. A particularly advantageous current detector circuit is presented below, but many other embodiments of current detector circuit are possible, and remain within the scope of the invention. In particular, a voltage comparator may be used, with one input receiving the voltage at node A or B, a second input receiving a reference voltage corresponding to the forward voltage of the corresponding diode 30, 28. All such voltages are measured with respect to the node 15 voltage, V–.

Figure 4:
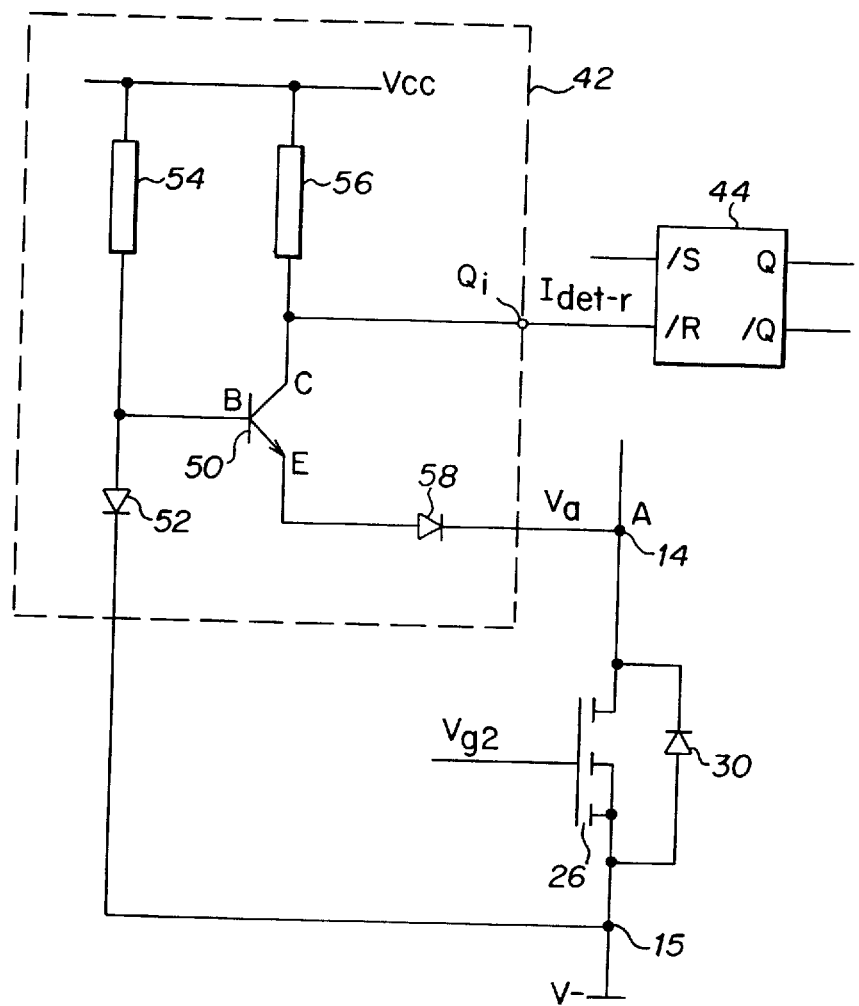
FIG. 4 shows an example of a current detector circuit according to the current invention.

FIG. 4 shows a current detector circuit 42 according to the invention. A bipolar transistor 50 is used. Its base B is connected to an anode of a biasing diode 52, whose cathode is connected to the negative output voltage V– at the node 15. The base B is further connected to a first resistor 54, which is further connected to a supply voltage Vcc. Voltage Vcc may be derived from the output voltage of the DC supply, or any other convenient source. A second resistor 56 is connected between the supply voltage Vcc and the collector C of the bipolar transistor 50. The collector C is also connected to the output Qi of the current detector circuit 42. The emitter E of the transistor 50 is connected to an anode of a sense diode 58, whose cathode is the sense input of the current detection circuit, and is thus connected to the drain terminal A of the MOS transistor 26 whose current is to be detected. The sense input is referenced to the negative output voltage V–, at node 15.

When the diode 30 is conducting, the node A voltage Va becomes one diode drop lower than the node 15 voltage V–. This in turn causes the emitter E of the transistor 50 to be at the voltage V–. The base 13 is still at one diode drop above the voltage V–, due to biasing diode 52, and so the bipolar transistor 50 turns on this pulls the output signal Idet-r of the current detector circuit 42 low. Hence, a low output signal Idet-r from the current detector circuit 42 indicates a current flowing in the associated MOSFET transistor parasitic drain-substrate diode 30. Once the low output signal Idet-r has been received by the /R input of RS latch 44, a high gate signal Vg2 is generated as described above. The MOSFET transistor 26 turns on, the voltage drop across it reduces, and the bipolar transistor 50 turns off again. The output signal Idet-r of the current detection circuit returns to its high state.

When diode 30 is not conducting, the Va will be more positive than one diode drop lower than the node 15 voltage. This will cause the voltage at the emitter E of transistor 50 to be more positive than the node 15 voltage V–. The voltage between the base B and the emitter E of bipolar transistor 50 is than less than a diode forward voltage. This transistor is therefore not conductive, and the output signal Idet-r is taken high by second resistor 56. In practice, the biasing and sense diodes 52, 58 may be diode connected transistors.

Figure 5:
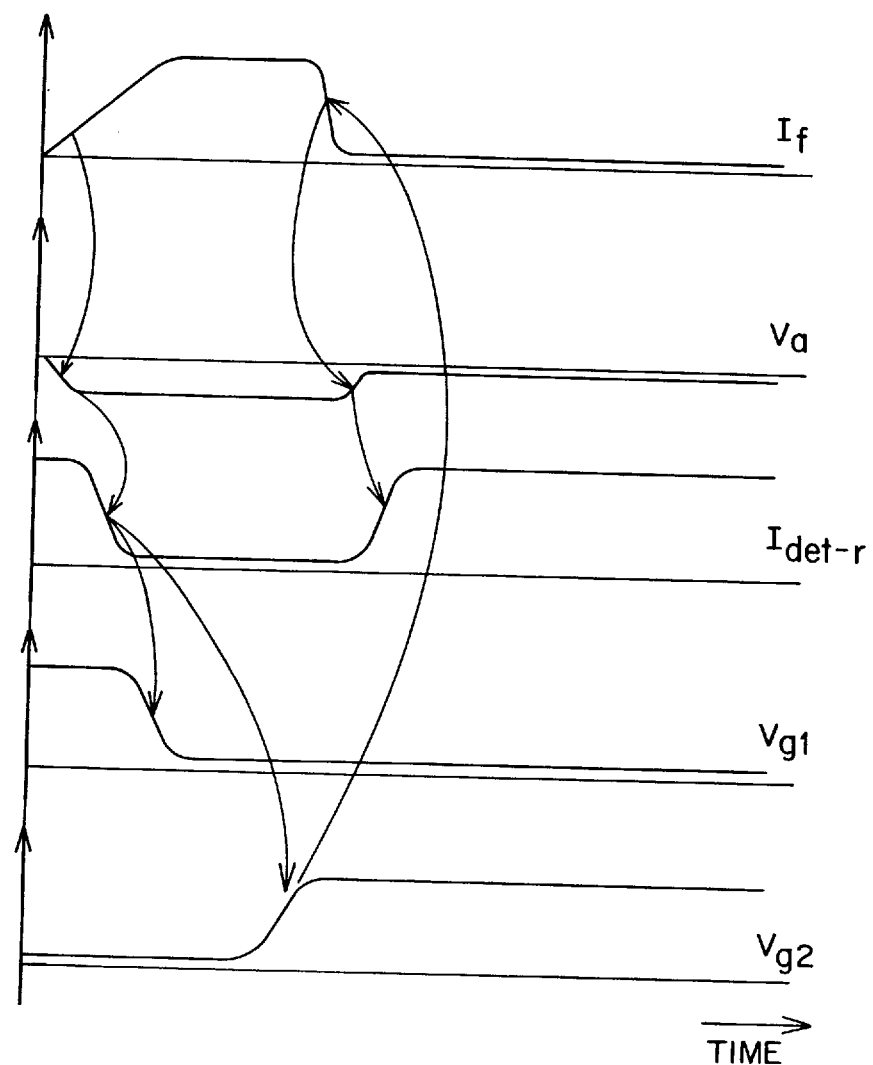
FIG. 5 shows a timing diagram of signals used and produced by the switched mode power supply circuit of FIG. 3.

FIG. 5 shows a timing diagram of signals used and generated by the current detection circuit 42. If represents the current flowing through parasitic drain-substrate diode 30. Va is the input to current detection circuit 42. ldet-r represents the output voltage of the current detection circuit 42. Vg2 represents the gate voltage of the MOSFET transistor 26. Vg1 represents the gate voltage of the MOSFET transistor 24.

The timing signals represented commence at the beginning of a negative half cycle of the voltage across the secondary winding Ls. The gate voltages of the MOSFET transistors are hold by the RS latch in the states established for the previous (positive) half cycle. The MOSFET transistor 26 is turned on (Vg2 is high), and MOSFET transistor 24 is off (Vg1 is low). The outputs Q, /Q of the RS latch 44 are high and low, respectively; the outputs Idet-r, Idet-s of the current detector circuits 42, 40 are both high.

A forward voltage is applied across the parasitic drain-substrate diode 30 by the series inductor 18. It begins to conduct, as shown in If. This causes a forward diode drop of approximately 0.7 V across this diode 30, independently of the magnitude of the current flowing through it (provided that a certain minimum current is flowing). This is illustrated, with respect to the node 15 voltage V−, as Va.

When the forward current If through diode 30 is very small, the voltage Va does not reach its full value of about 0.7 V. This follows from consideration of typical diode characteristics.

As described earlier, the development of this forward diode voltage drop leads to a low output Idet-r from the associated current detector 42. This low output to the /R input of the RS latch 44 causes it to change state, and provide a low output Q and a high output /Q. NOR gate 48 changes state due to a high /Q signal being applied. Its output signal Vg1 becoming low after the propagation delay of NOR gate 48, turning off MOSFET transistor 24. This low signal Vg1 is applied to an input of NOR gate 46. Together with the low Q signal, this causes its output Vg2 to go high, after one further NOR gate delay, turning the MOSFET transistor 26 on.

As this transistor 26 is rendered very conductive, the voltage Va across it becomes very low. The diode 30 ceases to conduct, as all current is now flowing through the transistor channel. This is shown in If. This causes the output Idet-r of the current detector circuit 42 to return to its high state. The RS latch 44 does not change state at this transition. MOSFET transistor 26 remains conductive for the rest of the half cycle, and until the next half cycle has begun. The current which then flows through parasitic diode 28 causes the current detector 40 to produce a low output signal Idet-s to IS, and change the state of the RS latch 44. In a similar fashion to that described above, this causes the signal Vg2 to become low, after the delay imparted by NOR gate 46, and the signal Vg1 to go high after a further delay imparted by NOR gate 48.

Accordingly, the main aims of the invention are achieved.

Problems may, however, arise when this circuit is operated with a very low current drain, for example when the external load RL is removed, or if it has a very high impedance. Referring again to FIG. 3, a very low current will then flow through the diodes 28, 30. The voltage drop across these diodes when conducting such a low current is not enough to activate the current detector circuits 40, 42. One of the MOSFET transistors, say 26, is held on by a high voltage Vg2 on its gate. If a positive half cycle now begins, a current begins to flow through the drain-substrate parasitic diode 28, which is now forward biased. The current is insufficient to be detected by the current detector circuit 40. No signal Idet-s is produced, and the high gate signal Vg2 remains, keeping MOSFET transistor 26 conductive. Capacitor 20 then discharges through series inductor 18 and MOSFET transistor 26. This causes the output voltage to drop, because the secondary winding Ls is then effectively short circuited by MOSFET transistor 26 and diode 28. This could damage the MOSFET 24 and the transformer 10.

Figure 6:
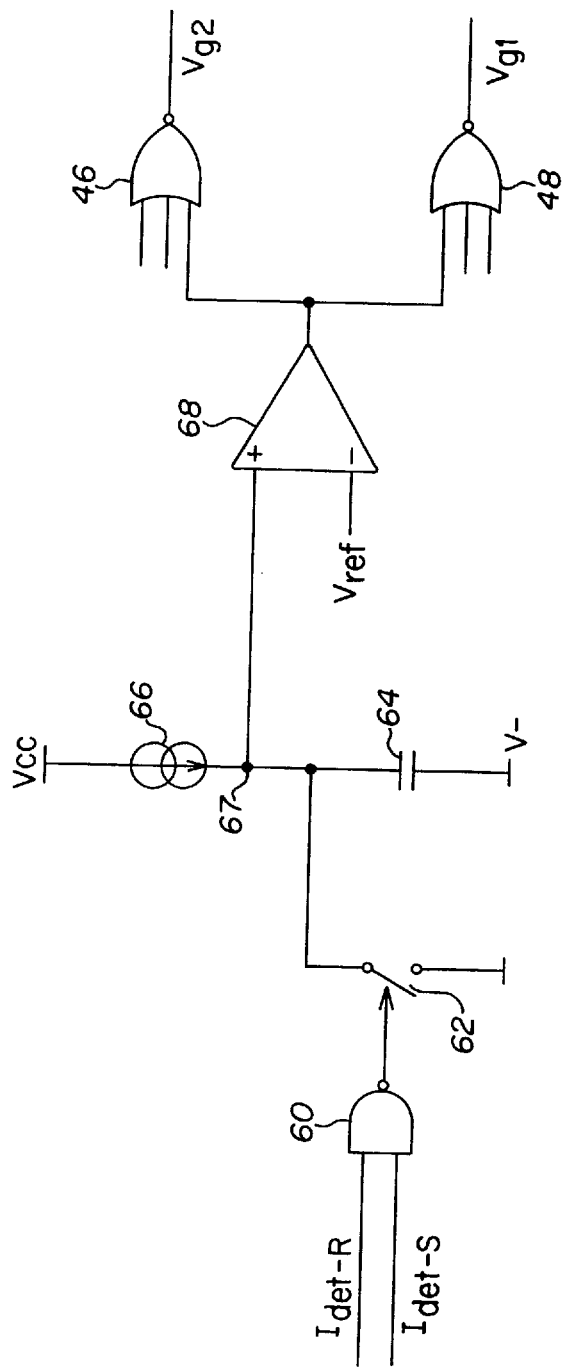
FIG. 6 shows a low current monitor circuit used in a control circuit of the current invention.

To avoid these problems, a low load monitoring circuit is provided, as shown in FIG. 6. A NAND gate 60 receives as inputs the two output signals Idet-r, Idet-s of the current detector circuits 42, 40. Its output is connected to a control terminal of a controlled switch 62, connected in parallel with a capacitor 64, between the negative output voltage V− and a signal node 67. A constant current source 66 is connected between the signal node 67 and supply voltage Vcc. A voltage comparator 68 receives a reference voltage Vref on a negative input, and the signal node 67 voltage on a positive input. An output of the comparator 68 is connected to third input terminals of NOR gates 46, 48, previously described with reference to FIG. 3, In normal operation, one of the signals Idet-r, Idet-s pulses low every half cycle of Vin. While both signals Idet-r, Idet-s are high, the output of NAND gate 60 is low, switch 62 is open, and capacitor 64 is charged by constant current source 66, Every half cycle, during normal operation, the output of NAND gate 60 pulses high, so closing controlled switch 62 and discharging the capacitor 64. The current supplied by the constant current source 66 and the size of the capacitor 64 are chosen such that the voltage of signal node 67 never exceeds the reference voltage Vref during normal operation. The output of voltage comparator 68 remains low, and the NOR gates 46, 48 function as previously described. The low load monitoring circuit acts as a timer, which is reset every half cycle of Vin.

During a period of very low current operation, the current detector circuits 40, 42 do not produce low pulses on their output signals Idet-s, Idet-r. The capacitor 64 is not discharged by controlled switch 62, as NAND gate 60 does not produce high pulses to the control terminal of the controlled switch 62. The voltage of signal node 67 rises until it exceeds Vref. The values of capacitor 64, current source 66 and Vref are preferably selected so that the voltage of signal node 67 exceeds Vref shortly after consecutive missing pulses on Idet-s and Idet-r, that is, slightly greater than one period of oscillation of Vin. Alternatively, values may be selected that cause signal node 67 to exceed Vref after only one missing pulse on either Idet-s or Idet-r, that is, slightly greater than one half-period of oscillation of Vin. The output of the voltage comparator 68 becomes high, and the NOR gates 46, 48 are both forced into a low output state. This means that both gate signals Vg1, Vg2 are held low. No further conduction through the MOSFET transistors is possible. The switched mode power supply continues to operate, by conduction through drain-substrate parasitic diodes 28, 30 during positive and negative half cycles, respectively.

Power is dissipated in the drain-substrate parasitic diodes due to their voltage drop of about 0.7 V each. As the current flowing is low, this dissipated power is tolerable. In these conditions, the power supply achieves the desired operation, without the possibility of short-circuiting the secondary winding Ls.

Figure 7:
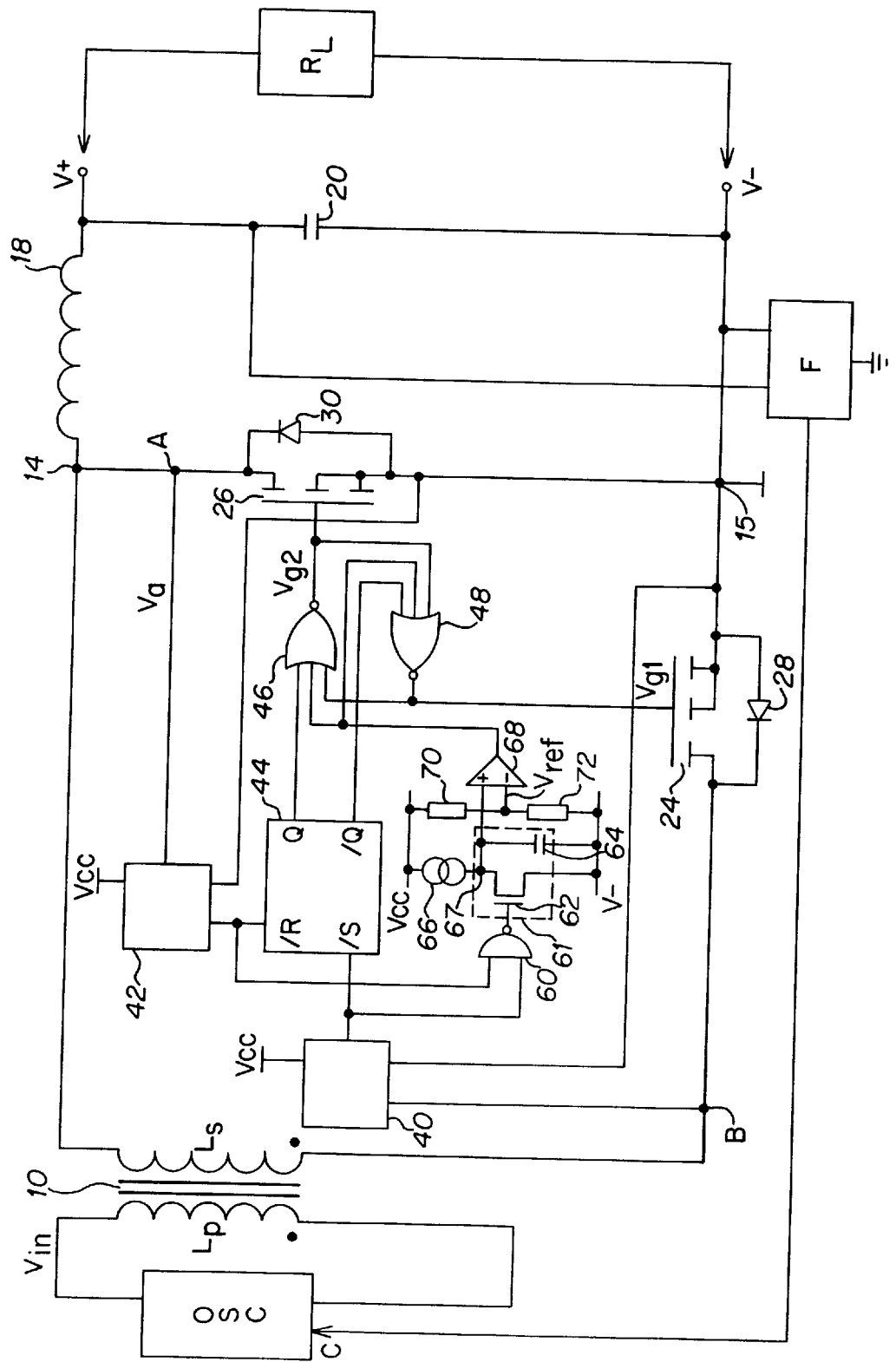
FIG. 7 shows a circuit diagram of a switched mode power supply incorporating a control circuit and low current monitor circuit, according to the current invention.

FIG. 7 shows such a low load monitoring circuit incorporated into the switched mode power supply. Controlled switch 62 is represented as an N-channel MOSFET, but could equally be a bipolar transistor or other controlled impedance device. The reference voltage Vref is derived from the supply voltage Vcc by resistors 70, 72 connected in series between this supply voltage and the negative output voltage V−.

The invention thus provides a circuit for the control of a switched mode power supply which dissipates little power, while using a simple transformer with only two windings. The invention does not require the provision of an auxiliary winding, and thus eliminates any noise and propagation delay to signals that may be caused by such an auxiliary winding.

Although one embodiment of the invention has been described by way of example, numerous variants will be apparent to those skilled in the art, without departing from the invention. In particular, the diodes 28, 30 may be distinct diodes, specially placed in parallel with MOSFET transistors. The current detection circuits may take any suitable design. P-channel transistors may replace the N-channel transistors as rectifying elements, with suitable changes to the gate signal generation. The circuit may find many applications other than that of a switched mode power supply, in any application which requires a high current, low voltage rectification of an alternating voltage.

We claim:

1. A switched mode power supply for rectifying an alternating voltage (Vin) comprising a control circuit for MOSFET transistors whereby each MOSFET transistor is driven by a control voltage applied to a gate terminal, a current detection circuit being connected to first and second terminals of each corresponding MOSFET transistor, wherein each current detection circuit is activated by a voltage between the first and second terminals of the corresponding MOSFET transistor attaining the value of a forward voltage drop across a parasitic or distinct diode connected in parallel with the corresponding MOSFET transistor, said current detection circuit detecting a current flowing in said parasitic diode, said current detection circuit turning on said corresponding MOSFET transistor and turning off an other MOSFET transistor when said forward voltage drop is detected.

2. A supply according to claim 1 wherein two MOSFET transistors are provided, operating in forward configuration synchronous mode.

3. A supply according to claim 1 wherein each current detection circuit includes a transistor whose emitter is connected to an anode of a first diode; whose base is connected to an anode of a second diode, the cathode of the first diode being connected to the first terminal of the corresponding MOSFET transistor, the cathode of the second diode being connected to the second terminal of the corresponding MOSFET transistor.

4. A supply according to claim 1 further comprising: a transformer having primary and secondary windings, the secondary winding having two terminals, each being connected to a drain terminal of first and second rectifying means, respectively, source terminals of said rectifying means being connected together at a reference node; a series inductor having first and second terminals has its first terminal connected to said first terminal of said secondary winding, and its second terminal connected to a first terminal of a capacitor, the capacitor having a second terminal connected to the said reference node; and an output voltage provided across the two terminals of the capacitor, wherein the rectifying means are N-channel MOSFET transistors each controlled by a control voltage applied to a respective gate terminal.

5. A supply according to claim 2 which applies first and second signals to the gates of said MOSFET transistors, including circuitry to ensure that no more than one MOSFET transistor receives a signal rendering its channel conductive at any one time.

6. A supply according to claim 1 further including a low load monitoring circuit which disables the generation of control voltages to gate terminals when a predetermined time has elapsed without either of the current detection circuits indicating a current flowing through either of the transistors.

7. A supply according to claim 6 wherein the low load monitoring circuit comprises a timing circuit which is normally reset during each half cycle of the alternating voltage by the current detector circuits, and which provides a control voltage inhibition signal if the timing circuit is not reset within the predetermined time.

8. A supply according to claim 7 wherein the timing circuit comprises a capacitor, a current source and a controlled impedance element, the resetting of the timer being performed by placing the controlled impedance element in parallel with the capacitor in a low impedance state, and the control voltage inhibition signal being generated in response to a voltage between the terminals of the capacitor.

9. A supply circuit according to claim 7, wherein the predetermined time is longer than the period of oscillation of the alternating voltage.

* * * * *

UNITED STATES PATENT AND TRADEMARK OFFICE
CERTIFICATE OF CORRECTION

PATENT NO. : 5,774,350
DATED       : June 30,1998
INVENTOR(S) : Joseph Notaro, Antoine Pavlin, Jean-Michel Ravon and
    Luc Wuidart It is certified that error appears in the above-identified patent and that said Letters Patent is hereby corrected as shown below:

On the title page, item [75] should read:

[75]    Inventors:    Joseph Notaro, Mascalucia, Italy;
                      Antoine Pavlin, Puyricard, France;
                      Jean-Michel Ravon, Fuveau, France;
                      Luc Wuidart, Pourrieres, France Signed and Sealed this First Day of September, 1998

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,774,350
DATED : June 30, 1998
INVENTOR(S) : Joseph Notaro, et al

It is certified that error appears in the above-identified patent and that said Letters Patent is hereby corrected as shown below:

Column 2, line 9, please change "3,3V" to --3.3V--.

Column 4, line 60, please change "A, B" to --B, A--;

Column 4, line 60, please change "26" to --24--;

Column 4, line 60, please change "24" to --26--.

Column 4, line 65, please change "A, B" to --B, A--;

Column 5, line 1, please "40, 42" to --42, 40--;

Column 5, line 22, "R1" should read --RL--.

Column 5, line 39, please change "46" to --48--.

Column 6, line 59, please change "26" to --24--;

Column 6, line 59, please change "Vg2" to --Vg1--;

Column 6, line 60, please change "24" to --26--;

Column 6, line 60, please change "Vg1" to --Vg2--;

UNITED STATES PATENT AND TRADEMARK OFFICE
CERTIFICATE OF CORRECTION

PATENT NO.   : 5,774,350
DATED        : June 30, 1998
INVENTOR(S)  : Joseph Notaro, et al.

It is certified that error appears in the above-identified patent and that said Letters Patent is hereby corrected as shown below:

Column 7, line 13, please change "becoming" to --becomes--.

Signed and Sealed this

Twentieth Day of April, 1999

Attest:

Q. TODD DICKINSON

*Attesting Officer*    *Acting Commissioner of Patents and Trademarks*